March 27, 1951  R. O. BILL  2,546,491
MEANS FOR RELATIVELY VERTICALLY ADJUSTING
A VEHICLE DRAFT MECHANISM AND BED
Filed Dec. 6, 1948
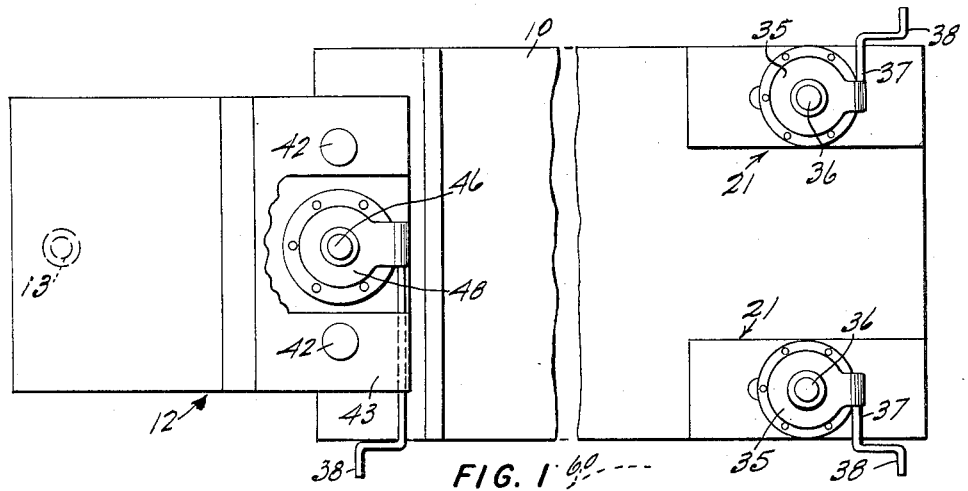
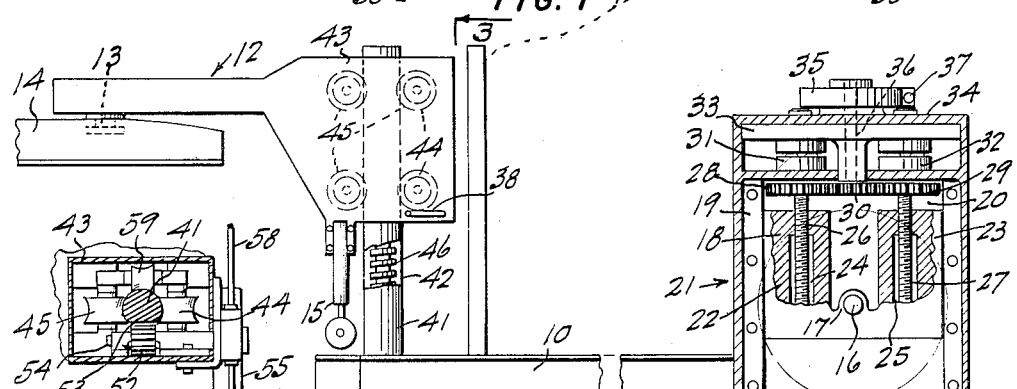
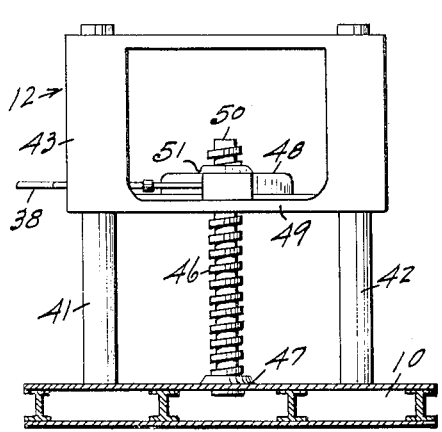
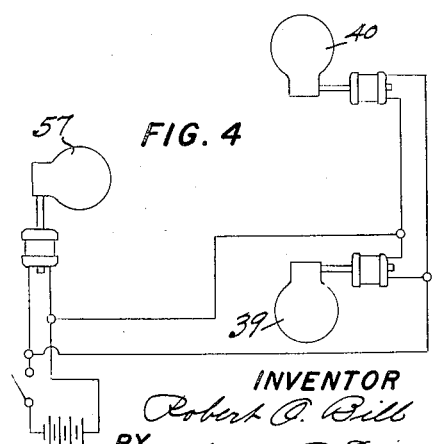
INVENTOR
Robert O. Bill
BY Philip A. Friedell
Attorney Patented Mar. 27, 1951

2,546,491

UNITED STATES PATENT OFFICE 2,546,491

MEANS FOR RELATIVELY VERTICALLY ADJUSTING A VEHICLE DRAFT MECHANISM AND BED

Robert O. Bill, San Leandro, Calif.

Application December 6, 1948, Serial No. 63,695

1 Claim. (Cl. 280—33.44)

This invention relates to improvements in trailers and particularly relates to semi-trailers, and is a modification of my application Serial Number 27,394, filed May 17, 1948, now Patent No. 2,475,443, granted July 5, 1949 which discloses a semi-trailer with hydraulically actuated elevating and lowering means while this application discloses mechanical means for elevating and lowering the bed relative to the draft mechanism such as a goose neck or the goose neck relative to the bed, depending on which is supported.

This invention relates specifically to vehicles which are equipped with only rear wheels, and in which the forward end is supported by a traction vehicle or tractor through a goose neck which also provides the coupling arrangement.

This invention is of particular interest in connection with the loading, unloading and movement of farm produce on the farm or between the farm and market centers, as also for handling freight of all kinds over the highways, and has the advantage of being operable for elevating and lowering at will in the absence of fluid pressure for operation.

The conventional semi-trailer has a bed the rear end of which is fixed as to height and is equipped at the forward end with legs or jacks which retract or fold under the bed or under the goose neck when the goose neck is coupled to and supported by a tractive device, and which are lowered and braced to support the forward end at normal elevation when uncoupled from the tractive device.

With this invention no such supporting devices are required because the bed can be lowered for support on the ground or road surface when a destination is reached, the goose neck can be elevated to uncouple from the tractor, and when the tractor is to be again coupled, the goose neck can be lowered to make the coupling, following which the bed can be raised to normal traveling level or raised even to a higher level for unloading from or loading onto raised platforms or the like. Furthermore, where the trailer has a body or a load which will not clear certain overhead obstructions such as underpasses, the trailer can be lowered sufficiently to clear reasonable heights within the limits of the elevating and lowering means before the obstruction is reached, and again elevated after the obstruction has been passed.

With this invention the semi-trailer can be drawn to the position where it is to be loaded or unloaded, and can then be lowered to the most desirable height, making loading and unloading far simpler, easier and quicker, in fact, will reduce the number of workers required by about 50% for the same loading or unloading time, or will cut the loading or unloading time in half with the same number of workers, because, with the conventional semi-trailer it is usually necessary to have one man on the trailer for stacking or for bringing the freight within reach, for each man carrying the freight to or from the trailer, while with this invention the man can walk directly onto the trailer, and stack or remove the freight.

The objects and advantages of the invention are as follows:

First, to provide a semi-trailer with mechanical means for elevating and lowering the bed relative to the goose neck, or the goose neck relative to the bed at will.

Second, to provide a semi-trailer as outlined with mechanical elevating and lowering means for the rear and front ends of the bed, for convenience in loading and unloading, and for coupling to and uncoupling from a tractive device.

Third, to provide mechanically actuable coupling and uncoupling means between a semi-trailer and a tractor.

Fourth, to provide a semi-trailer as outlined in which the elevating and lowering means for the respective ends of the bed is individually controllable.

Fifth, to provide a mechanically actuable elevating semi-trailer which is relatively simple in construction and arrangement and which provides a rigid coupling between the trailer and the tractor irrespective of the degree of adjustment.

In describing the invention reference will be had to the accompanying drawings, in which:

Fig. 1 is a top plan view of the invention with the intermediate section of the bed removed.

Fig. 2 is a side elevation of Fig. 1, and partly shown in section to show the interior operating mechanisms.

Fig. 3 is a section taken on line 3—3 of Fig. 2.

Fig. 4 is a wiring diagram for motor operation of the elevating mechanisms.

Fig. 5 shows a modification in which rack and pinion elevating mechanisms is used, in conjunction with a speed reducer.

The invention can be applied to any type of semi-trailer, with body or with platform bed, and as shown consists of a platform or bed 10, rear wheels 11 and a goose neck 12 having coupling means 13 for coupling to a tractor 14, and which goose neck may be provided with conventional jacks 15 for support of the front end when the bed is not to be lowered.

The rear wheels are each mounted on a stub axle 16 which is fixed in a bearing 17 which in turn is integral with a slide 18 which is slidably retained by the gibs 19 fixed on the back wall 20 of the rear wheel housing 21 which simultaneously functions as a fender.

The slide 18 is provided with two columns 22 and 23 having axial bores 24 and 25 which terminate at their upper ends in axial threaded bores for the screws 26 and 27 on which are mounted the spur gears 28 and 29 and which mesh with the intervening pinion 30, the upper ends of the screws being fixed in the lower races of the thrust bearings 31 and 32 which thrust against the thrust plate 33.

Mounted on top of the thrust plate mounting 34 or top of the housing is a worm gear speed reducer 35 having a main shaft 36 which couples the worm gear of the speed reducer to the pinion 30, and a shaft 37 is connected to the worm of this speed reducer and may be operated manually as by a crank 38 or by means of motors 39 and 40 (Fig. 4).

Two vertical guides 41 and 42 are fixed in the forward end of the bed and operated through a housing 43 on the rearward end of the goose neck 12 and are guided between concave rollers 44 and 45 or other suitable guiding means to provide a rigid sliding connection between the bed 10 and goose neck 12.

The elevating and lowering means consists of a screw 46 which is intermediately located between the guides with the lower end anchored in the front portion of the bed as indicated at 47. A worm gear speed reducer 48 is mounted on the base member 49 of the goose neck with the screw threadedly operating therethrough as indicated at 50 with the screw having sliding fit through the hubs 51 of the speed reducer housing.

A modification is shown in Fig. 5 in which the guides 41 and 42 are mounted between the rollers 44 and 45 the same as in the previous explanation but varies from the preceding in that the guides also function as the raising and lowering means in connection with the pinion 52 which cooperates with the rack 53 which is cut in one side of the guide, and which pinion is driven through a shaft 54 by a worm gear speed reducer 55 with a shaft 56 for driving the worm either by means of a crank 38 (Fig. 1), or by means of a motor 57 (Fig. 4), a shaft 58 connecting the two worms of the speed reducers. A backing roller 59 is provided to take the thrust of the pinion 52.

To load or unload the trailer, the bed 10 can be lowered to the most desirable elevation down to ground or road level or maintained in its traveling position.

To uncouple the trailer from the tractor, the jacks 15 can be lowered to support the front end of the trailer and the tractor can then be uncoupled and re-coupled in the usual way, so that it operates as a conventional semi-trailer.

Also, the bed can be lowered to rest on the ground or road, and the goose neck then can be adjusted up to uncouple from the trailer, and again adjusted down to couple, after which operation of the speed reduction mechanism will elevate the bed to normal traveling level. Thus, if the bed is supported, the goose neck can be adjusted mechanically to either a higher or a lower level, the bed can be sloped by varying the adjustment front and rear when these ends are independently adjustable as illustrated in Figs. 1 and 2, and in case the load 60 will not clear an overhead obstruction, such as an underpass, the bed with its load can be lowered to pass through, and then again elevated to normal travel lever after the obstruction is passed. Operation merely requires the manual operation of cranks 38, or battery operation of the motors 39, 40 and 57, the worm gear speed reducers forming effective locks for any adjusted position of the bed, and the screw and worm and worm gear arrangement providing a positive lock which will not let go with any load.

Obviously other types of mechanisms can be used though the arrangements shown perform simultaneously two functions, that of elevating or lowering, and of holding the adjusted position. They are also more easily operated with heavy loads.

I claim:

Means for relatively vertically adjusting a gooseneck and the bed of a vehicle comprising a pair of transversely spaced vertical standards having their lower ends fixed to the front end of the bed, a gooseneck having a tongue and a head with the tongue attachable to a tractive device and the head including a housing on each side with intervening upper and lower cross members and with the housings having passages for the standards and slidable thereon; a worm-gear reduction mounted on the lower cross member centrally of the space between the housings, and a screw threadedly operating through the worm gear reduction and having its lower end fixed to the forward end of the bed, and means for operating said worm gear reduction at will.

ROBERT O. BILL.

REFERENCES CITED

The following references are of record in the file of this patent:

UNITED STATES PATENTS

| Number | Name | Date |
| --- | --- | --- |
| 364,034 | Nye | May 31, 1887 |
| 1,310,144 | Schneider | July 15, 1919 |
| 2,189,864 | McDaniel | Feb. 13, 1940 |
| 2,196,338 | McDaniel | Apr. 9, 1940 |
| 2,200,504 | Keen | May 14, 1940 |
| 2,475,443 | Bill | July 5, 1949 |